(12) United States Patent
Mangaldeep et al.

(10) Patent No.: US 12,373,258 B2
(45) Date of Patent: Jul. 29, 2025

(54) METHOD AND ELECTRONIC DEVICE FOR MANAGING MEMORY

(71) Applicant: Samsung Electronics Co., Ltd., Suwon-si (KR)

(72) Inventors: Mangaldeep, Noida (IN); Manisha Meena, Noida (IN); Bittu Kumar Singh, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 435 days.

(21) Appl. No.: 17/949,642

(22) Filed: Sep. 21, 2022

(65) Prior Publication Data

US 2023/0098312 A1    Mar. 30, 2023

Related U.S. Application Data

(63) Continuation of application No. PCT/KR2022/014040, filed on Sep. 20, 2022.

(30) Foreign Application Priority Data

Sep. 21, 2021  (IN) .............................. 202141042753

(51) Int. Cl.
*G06F 9/46*    (2006.01)
*G06F 9/50*    (2006.01)

(52) U.S. Cl.
CPC .......... *G06F 9/5038* (2013.01); *G06F 9/5016* (2013.01); *G06F 9/5044* (2013.01)

(58) Field of Classification Search
CPC .... G06F 9/5038; G06F 9/5016; G06F 9/5044; G06F 12/02; G06F 12/023; G06F 3/06
See application file for complete search history.

(56) References Cited

U.S. PATENT DOCUMENTS

| | | |
|---|---|---|
| 2008/0104319 A1 | 5/2008 | Hu et al. |
| 2009/0049256 A1 | 2/2009 | Hughes et al. |
| 2013/0047198 A1 | 2/2013 | Srour et al. |
| 2013/0138876 A1 | 5/2013 | Wang |
| 2013/0332942 A1 | 12/2013 | Ramesh et al. |
| 2014/0244912 A1 | 8/2014 | Birk et al. |

(Continued)

FOREIGN PATENT DOCUMENTS

| | | |
|---|---|---|
| KR | 10-2020-0111295 A | 9/2020 |
| KR | 10-2534744 B1 | 5/2023 |

OTHER PUBLICATIONS

International Search Report with Written Opinion dated Dec. 23, 2022; International Appln. No. PCT/KR2022/014040.

(Continued)

*Primary Examiner* — Diem K Cao
(74) *Attorney, Agent, or Firm* — Jefferson IP Law, LLP (57) ABSTRACT

A method for managing a memory by an electronic device, and the electronic device, are provided. The method includes detecting a plurality of applications being executed and using the memory of the electronic device, determining a priority for each application of the plurality of applications, determining at least one page from a plurality of pages of at least one application from the plurality of applications to be dropped based on at least one priority associated with the at least one application, and dropping the at least one page from the plurality of pages of the at least one application.

15 Claims, 8 Drawing Sheets

(56) References Cited

U.S. PATENT DOCUMENTS

| | | |
|---|---|---|
| 2015/0347309 A1 | 12/2015 | McIntyre |
| 2017/0010963 A1 | 1/2017 | Bobroff et al. |
| 2018/0103131 A1 | 4/2018 | Murashkin et al. |
| 2018/0307600 A1* | 10/2018 | Wang ................ G06F 12/02 |
| 2019/0196860 A1 | 6/2019 | Bain et al. |
| 2019/0205265 A1* | 7/2019 | Fang ................ G06F 9/4843 |
| 2019/0220318 A1* | 7/2019 | Yang ................ G06F 9/445 |
| 2020/0393982 A1 | 12/2020 | Cha et al. |

OTHER PUBLICATIONS

Indian Office Action dated Sep. 15, 2023; Indian Appln. No. 202141042753.

* cited by examiner

METHOD AND ELECTRONIC DEVICE FOR MANAGING MEMORY

CROSS-REFERENCE TO RELATED APPLICATION(S)

This application is a continuation application, claiming priority under § 365 (c), of an International application No. PCT/KR2022/014040, filed on Sep. 20, 2022, which is based on and claims the benefit of an Indian Complete patent application No. 202141042753, filed on Sep. 21, 2021, in the Indian Patent Office, the disclosure of which is incorporated by reference herein in its entirety.

FIELD OF INVENTION

The disclosure relates to managing a memory. More particularly, the disclosure relates to a method and an electronic device for optimizing a volatile memory for better multitasking.

BACKGROUND

Current smartphones are no less than computer systems with a large amount of volatile memory to run applications. Processes of various applications executing the corresponding application interact with data on the volatile memory of a smartphone with each process occupying pages of the volatile memory to use. Pages are units of memory whose size depends on the memory footprint of the volatile memory. Memory footprint refers to an amount of main memory that a program uses or references while running.

The word footprint generally refers to the extent of physical dimensions that an object occupies, giving a sense of its size. However, in computing, the memory footprint of a software application indicates its runtime memory requirements, while the program executes. This includes all sorts of active memory regions like code segment containing (mostly) program instructions (and occasionally constants), data segment (both initialized and uninitialized), heap memory, call stack, plus memory required to hold any additional data structures, such as symbol tables, debugging data structures, open files, shared libraries mapped to the current process, etc., that the program needs while executing and will be loaded at least once during the entire run.

Larger programs have larger memory footprints. An application's memory footprint is roughly proportionate to the number and sizes of shared libraries or classes it loads, whereas static libraries, executable programs and static data areas contribute to a fixed (constant) portion. Programs themselves often do not contribute the largest portions to their own memory footprints; rather, structures introduced by the run-time environment take up most of the memory.

Figure 1A:
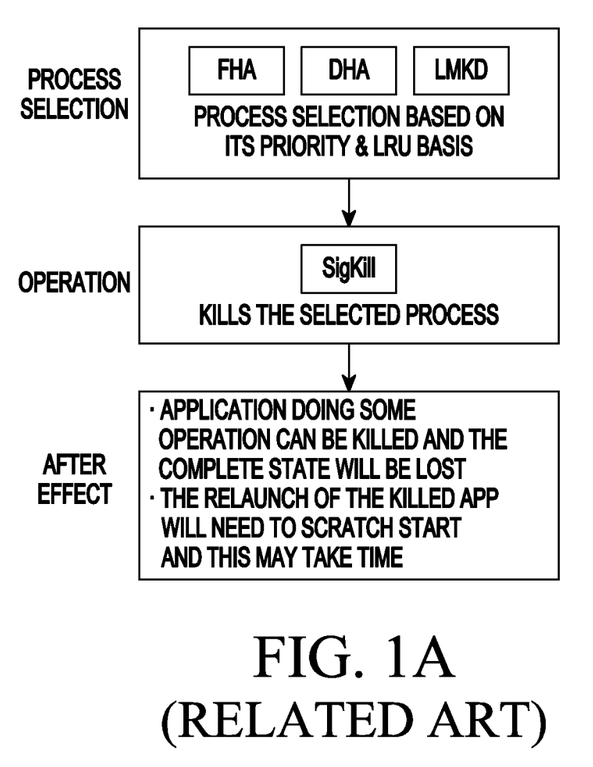
FIGS. 1A and 1B illustrate methods to optimize volatile memory, according to the related art.
Figure 1B:
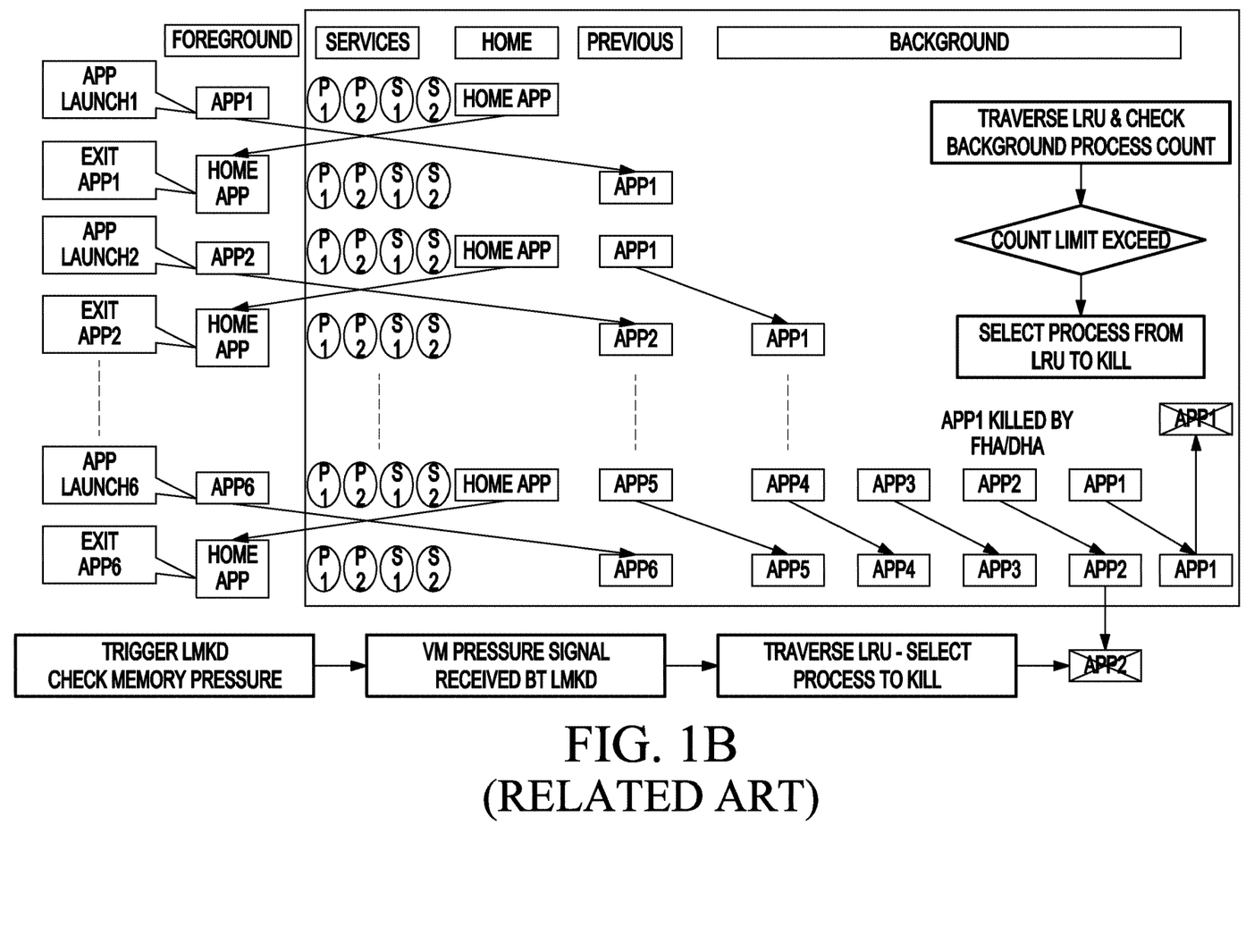

With an increasing number of applications and volatile memory being expensive, there is a perpetual memory crunch with respect to smartphones. Multitasking where priority processes are executed to save memory footprint is necessary. Methods of the related art to optimize memory in computing devices or electronic devices such as, but not limited to, smartphones, tablet computers, portable computing devices, desktop computers and the like include killing running processes in the volatile memory as illustrated in FIGS. 1A and 1B. Relaunching killed applications is always rendered slow affecting the overall device performance. For example, when a user listens to music while using an intensive application like the camera, the music application could be killed to save memory footprint. To relaunch the music application is slower than the previous instance.

Methods of the related art as illustrated in FIGS. 1A and 1B include using fixed hidden applications (FHA) or dynamic hidden applications (DHA) where background applications are killed if a number of background applications exceeds a pre-defined limit. Another method of the related art includes low memory killer daemon (LMKD) where the memory state of an electronic device is monitored and high memory pressure is reacted to by killing the least essential processes to keep the device performing at optimum levels. Yet another method in the related art includes killing background processes if the available volatile memory goes below a predefined threshold or an out of memory situation.

There remains a need for more efficient methods to optimize the volatile memory to improve performance and prevent slowing down of the computing device or electronic device.

The above information is presented as background information only to assist with an understanding of the disclosure. No determination has been made, and no assertion is made, as to whether any of the above might be applicable as prior art with regard to the disclosure.

OBJECT OF INVENTION

Aspects of the disclosure are to address at least the above-mentioned problems and/or disadvantages and to provide at least the advantages described below. Accordingly, an aspect of the disclosure is to provide a method of optimizing volatile memory of an electronic device.

Another aspect of the disclosure is to reclaim application pages in the volatile memory based on priority of the pages.

Another aspect of the disclosure is to selectively determine the pages to be dropped.

Another aspect of the disclosure is to select processes or pages to be dropped based on last activity and the process/page type.

Additional aspects will be set forth in part in the description which follows and, in part, will be apparent from the description, or may be learned by practice of the presented embodiments.

SUMMARY

In accordance with an aspect of the disclosure, a method for managing a memory performed by an electronic device is provided. The method may include detecting a plurality of applications being executed and using a memory of the electronic device. The method may include determining a priority for each of the plurality of applications. The method may include determining at least one page from a plurality of pages of at least one application from the plurality of applications to be dropped based on at least one priority associated with the at least one application. The method may include dropping the at least one page from the plurality of pages of the at least one application.

In an embodiment, determining the priority for each of the plurality of applications may comprise determining, for each of the plurality of applications, a frequency of use, a category, a last activity, and a memory footprint, and determining the priority for each of the plurality of applications based on the frequency of use, the category, the last activity, and the memory footprint.

In an embodiment, the method may further comprise estimating available memory footprint in the memory based on the memory footprint being collectively used by the plurality of applications being executed.

In an embodiment, determining the at least one page from the plurality of pages of the at least one application from the plurality of applications to be dropped based on the at least one priority associated with the at least one application may comprise detecting active and inactive pages among the plurality of pages of the at least one application from the plurality of applications based on the determined priority for the at least one application, prioritizing at least one of the anon or file pages based on frequency of use and last referenced time, and dropping one or more pages with a least priority to maintain an available memory footprint.

In an embodiment, the method may further comprise reclaiming a memory footprint in the memory used by the dropped at least one page from the plurality of pages.

In accordance with an aspect of the disclosure, an electronic device is provided. The electronic device includes a memory, and at least one processor coupled to the memory. The at least one processor may be configured to detect a plurality of applications being executed and using the memory. The at least one processor may be configured to determine a priority for each of the plurality of applications. The at least one processor may be configured to determine at least one page from a plurality of pages of at least one application from the plurality of applications to be dropped based on at least one priority associated with the at least one application. The at least one processor may be configured to optimize the memory by dropping the at least one page from the plurality of pages of the at least one application.

In accordance with an aspect of the disclosure, a non-transitory computer readable medium storing instructions is provided. The instructions, when executed by at least one processor of an electronic device, cause the electronic device to perform operations. The operations may comprise detecting a plurality of applications being executed and using a memory of the electronic device. The operations may comprise determining a priority for each of the plurality of applications. The operations may comprise determining at least one page from a plurality of pages of at least one application from the plurality of applications to be dropped based on at least one priority associated with the at least one application. The operations may comprise dropping the at least one page from the plurality of pages of the at least one application.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION OF INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Referring now to the drawings, and more particularly to FIGS. 1C, 2 to 4, and 5A to 5C, where similar reference characters denote corresponding features consistently throughout the figures, there are shown preferred embodiments.

Accordingly, embodiments herein disclose a method performed by an electronic device 100 for memory optimization, the method comprising detecting, by the electronic device 100, a plurality of applications being executed that use a volatile memory 102 of the electronic device 100; determining, by the electronic device 100, a priority for each application of the plurality of applications; detecting, by the electronic device 100, a criteria for the memory 102 of the electronic device; determining, by the electronic device 100, at least one page from a plurality of pages of at least one application from the plurality of applications to be dropped based on the priority associated with the at least one application; and optimizing, by the electronic device 100, the memory of the electronic device by dropping the at least one page from the plurality of pages of the at least one application.

In an embodiment, wherein the determining, by the electronic device 100, of the priority for each application of the plurality of applications comprises determining, for each application of the plurality of applications, a frequency of use, a category, a last activity, and a memory footprint; and determining the priority for each application of the plurality of applications based on the frequency of use, the category, the last activity, and the memory footprint.

In an embodiment, the criteria for the memory 102 of the electronic device comprises estimating, by the electronic device 100, available memory footprint in the memory 102 based on a memory footprint being collectively used by the plurality of applications being executed.

In an embodiment, wherein the determining, by the electronic device, of the at least one page from the plurality of pages of the at least one application from the plurality of applications to be dropped based on the priority associated with the at least one application comprises detecting, by the electronic device 100, active and inactive pages among the plurality of pages of at least one application from the plurality of applications based on the determined priority; and dropping, by the electronic device 100, the inactive pages based on the priority to maintain the available memory footprint.

In an embodiment, the method further comprises reclaiming, by the electronic device 100, the memory footprint in the volatile memory 102 used by the dropped pages.

Accordingly, embodiments herein disclose electronic device 100 comprising a volatile memory 102 configured for use by a plurality of applications being executed; a priority engine 104 communicably coupled to the volatile memory 102, the priority engine 104 configured for detecting the plurality of applications being executed that use the volatile memory 102; determining a priority for each application of the plurality of applications; a memory optimizer 106 communicably coupled to the priority engine 104, the memory optimizer configured for detecting a criteria for the memory 102 of the electronic device; determining at least one page from a plurality of pages of at least one application from the plurality of applications to be dropped based on the priority associated with the at least one application; and optimizing the memory by dropping the at least one page from the plurality of pages of the at least one application.

Figure 1C:
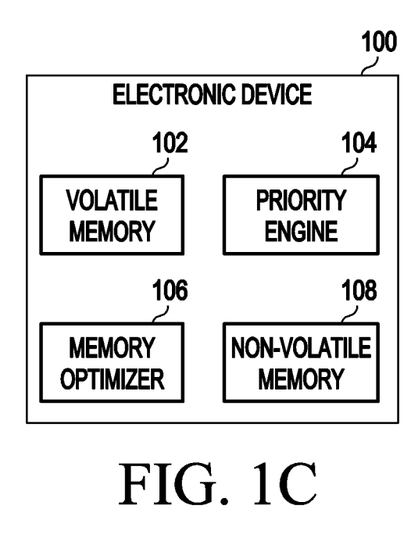
FIG. 1C is a block diagram of an electronic device with memory optimization, according to an embodiment of the disclosure.

FIG. 1C is a block diagram of an electronic device 100 with memory optimization, according to an embodiment of the disclosure.

Referring to FIG. 1C, the electronic device 100 includes a volatile memory 102, a priority engine 104, a memory optimizer 106 and non-volatile memory 108. The priority engine 104 and the memory optimizer 106 may be implemented through at least one processor. Operations of the priority engine 104 and the memory optimizer 106 may be executed by at least one processor. Typically, the applications are run in a framework provided by an operating system stored on the non-volatile memory 108. The application data could be stored on the non-volatile memory 108 as well however current processes pertaining to the applications such as when the application is launched or is interacting with other system level processes, are executed from the volatile memory 102. The priority engine 104 traverses running processes in the volatile memory 102. The process priority is determined based on the following:

$$\text{Priority} = ((adj\_score - \text{Hotness}*10)*10 + \text{LastActiveTimeMin}*2 + PSS\ \text{Size}*3) \quad \text{Equation 1}$$

Hotness refers to a number of launches of the corresponding application per day, adjacent score is a value given to each process based on its importance and category. LastActiveTimeMin refers to the time since the last time process has been active. Typical ranges of priority value are defined in Table 1 below:

TABLE 1

| Priority value - range | Priority level |
|---|---|
| 0-4000 | HIGH |
| 4000-8000 | MID |
| 8000-12000 | LOW |

Example priority values of various generic applications is provided in Tables 2 and 3 below:

TABLE 2

| Process | Priority |
|---|---|
| Gallery | 750 |
| Music | 1360 |
| launcher | 3220 |
| Contact | 5670 |
| Calendar | 9420 |

TABLE 3

| App | Hotness | Adj | Pss MB | Last Used |
|---|---|---|---|---|
| Gallery | 25 | 0 | 250 | 0 |
| Music | 10 | 200 | 120 | 0 |

TABLE 3-continued

| App | Hotness | Adj | Pss MB | Last Used |
|---|---|---|---|---|
| launcher | 30 | 600 | 70 | 5 |
| Contact | 40 | 950 | 50 | 10 |
| Calendar | 1 | 910 | 40 | 150 |

In an embodiment, the electronic device 100 further includes an application launch tracker that records the events pertaining to launch and exits of applications. An application information database is stored on the non-volatile memory 108 or the volatile memory 102 to maintain application information such as but not limited to launch time, and usage frequency.

In an embodiment, deep learning is used to update the priority calculation formula, over multiple iterations of estimation Priority Scores can be updated for a category of applications, or for applications launched at a particular time of the day or for applications used or not used for varying lengths of time. For example, an application has been accorded with a high priority score, that is determined using a trained neural network model for various application types and contents running across multiple platforms over the period. The previous estimation of usage at particular time or location has been considered as essential factor for this application. For another application some factor such as over multiple iterations of estimation, priority scores can be adjusted to processes for a category of applications, or for applications launched at a particular time of the day or for applications used or not used for varying lengths of time have been derived.

A memory including the volatile memory 102 and the non-volatile memory 108 may store instructions to be executed by at least one processor of the electronic device 100. When the instructions are executed by the at least one processor, the instructions may cause the electronic device 100 to perform operations of the electronic device described in the present disclosure.

Figure 2:
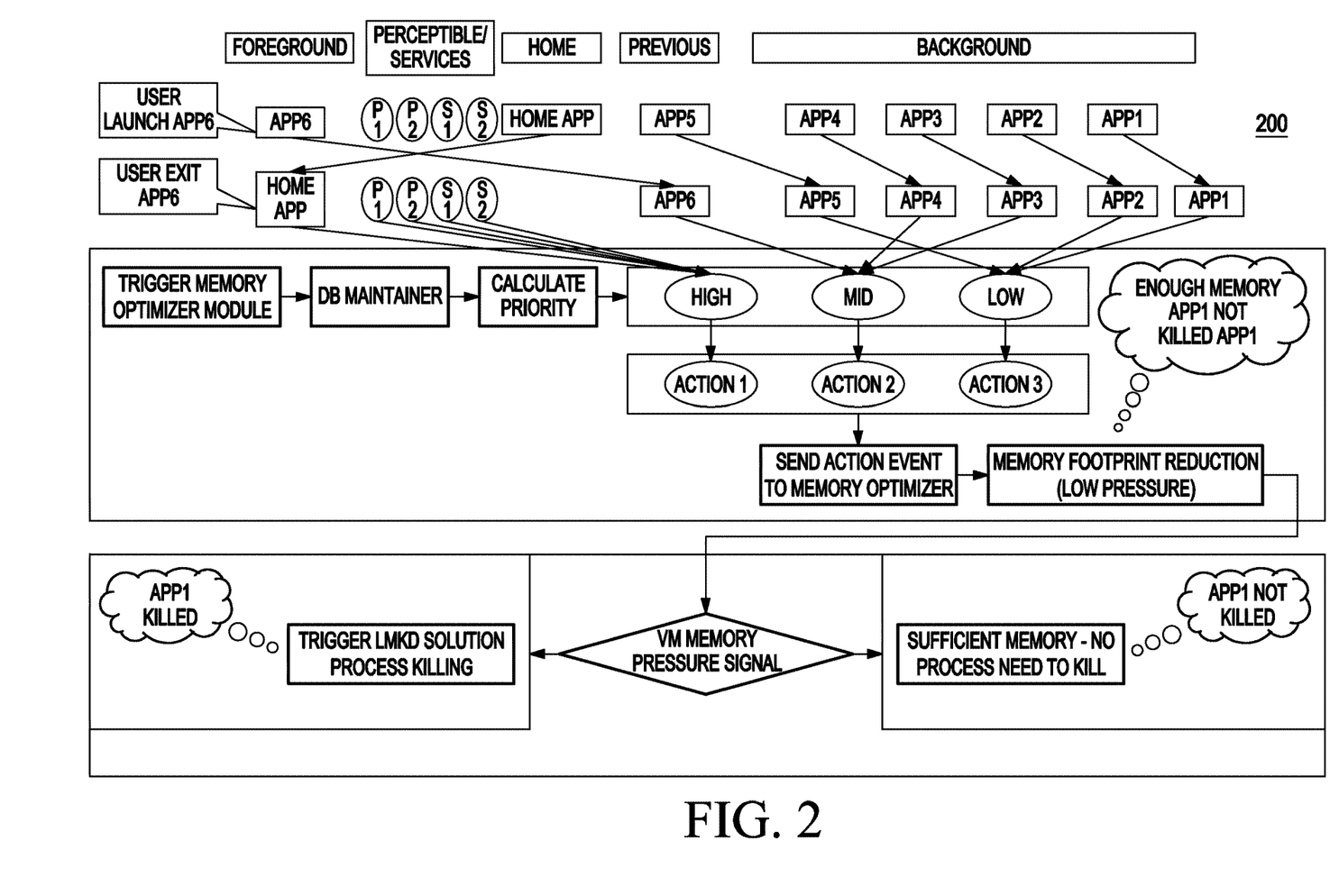
FIG. 2 is a flow diagram illustrating a method for memory optimization, according to an embodiment of the disclosure.

FIG. 2 is a flow diagram 200 illustrating a method for memory optimization, according to an embodiment of the disclosure.

Referring to FIG. 2, based on information from the application launch tracker and the application information database, processes are categorized as high priority, mid-priority or low priority which dictates future action events. The recommended action event such as dropping pages or killing the application is based on a criteria of the volatile memory 102 dependent on available memory footprint. If the footprint is not sufficient even with dropping pages leading to a high pressure scenario, existing methods of LMKD solutions are implemented. By dropping pages however can ease the pressure in the volatile memory leading to no process being killed. The criteria to the volatile memory 102 of the electronic device 100 comprises estimating by the memory optimizer 106, available memory footprint in the volatile memory 102 based on the memory footprint being used by the plurality of processes being executed on the memory 102.

In an embodiment, the electronic device 100 tracks the applications being launched using an application launch tracker. In an embodiment, any information regarding the open applications being executed is stored in an application database. The application database can be present on the volatile memory 102 or any non-volatile memory communicably connected to the electronic device 100. The application database maintains application information like launch time, proportional set size (PSS) of the volatile memory, use frequency of the application launched and the like. Based on the application information, a priority is determined using Equation 1. The memory optimizer 106 selects the process eligible for optimization and using kernel memory management unit in the volatile memory to implement appropriate page dropping.

Figure 3:
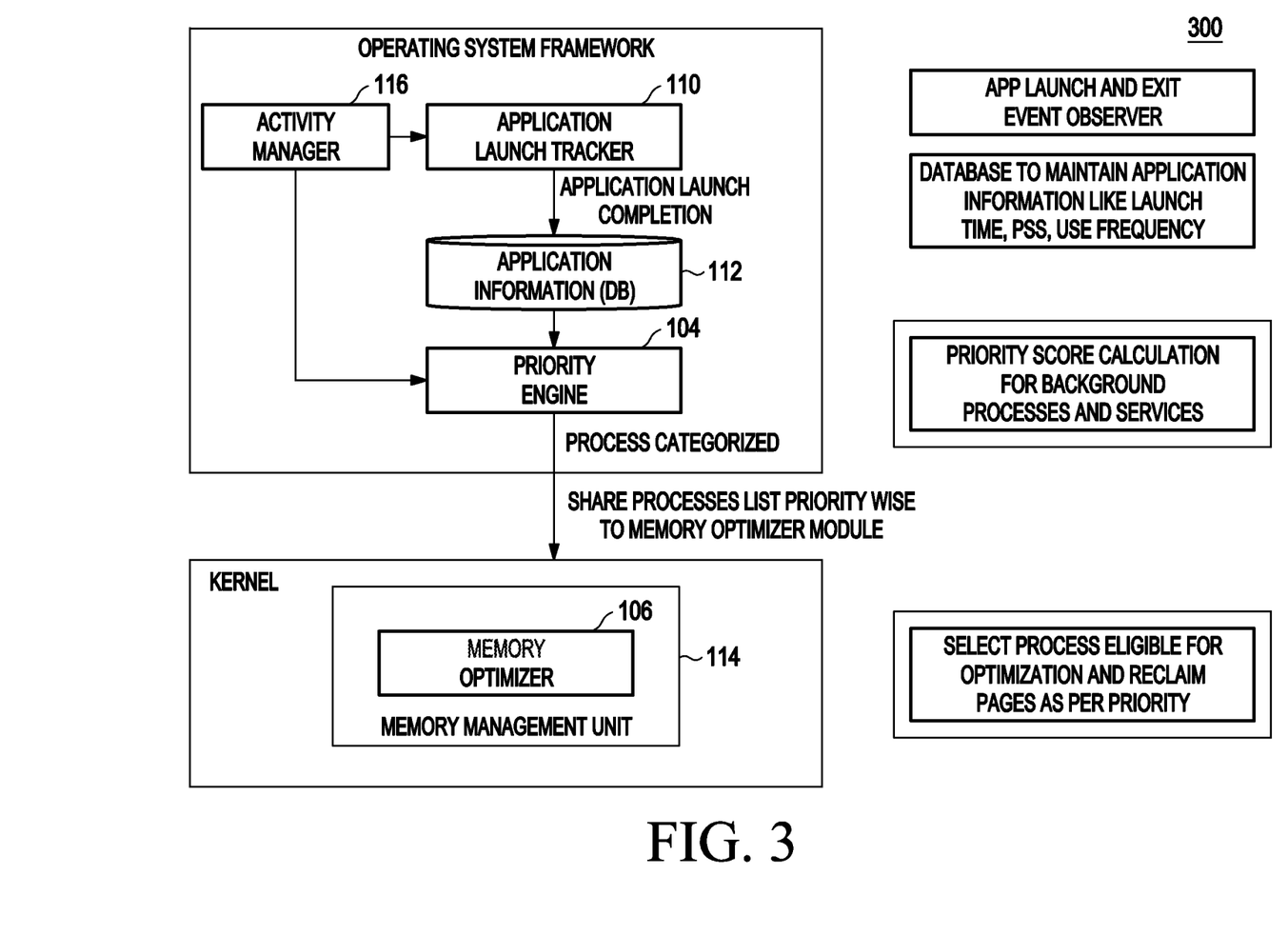
FIG. 3 is a flow diagram illustrating a sequence of operations in the electronic device for memory optimization, according to an embodiment of the disclosure.

FIG. 3 is a flow diagram 300 illustrating a sequence of operations in the electronic device 100 for memory optimization, according to an embodiment of the disclosure.

Referring to FIG. 3, the application launch tracker 110 records events pertaining to application launches or exits. This information is stored in the application information database 112. Information stored includes but is not limited to launch time, usage frequency of the applications, memory footprint used, proportional set size (PSS) of the volatile memory 102 used by the application and the like. The priority engine 104 determines priority using Equation 1 provided above. The memory optimizer 106 in a kernel memory management unit 114 in the volatile memory 102 performs page dropping and/or reclaim as per the determined priority and criteria of volatile memory 102. An activity manager 116 provides the running processes list to the priority engine 104 to calculate priority score based on Equation 1.

In an example, a user may be using an application for filling a form on the electronic device 100. While filling the form, the user receives an incoming call on the electronic device 100. Accordingly, the call application is launched. Information regarding the first application is retained in the application information database 112. Based on Equation 1, owing to the current usage of the form filling application, hotness, the Last ActiveTimeMin and other parameters are expected to be high thereby the priority score is typically in the HIGH range. Therefore, the memory optimizer 106 chooses to drop pages pertaining to other background processes with lesser priority.

Ultimately, in this use case scenario, the earlier state of the form filling application is retained once the call is done. This is specifically useful when the overall memory capacity in the volatile memory 102 is low and thereby using the memory optimizer 106 provides better multi-tasking.

In yet another example, web browser applications can be trimmed by page dropping while intensive applications are executed in the foreground. For example, while executing a multimedia application in the foreground, the memory optimizer 106 can drop pages pertaining to web browser applications operating in the background to provide a higher footprint to the application running in the foreground.

In another example, background application pages are dropped to provide more footprint to potential new application launches. A new application launch is detected by the application launch tracker 110 and appropriate footprint is adjusted for the same.

Figure 4:
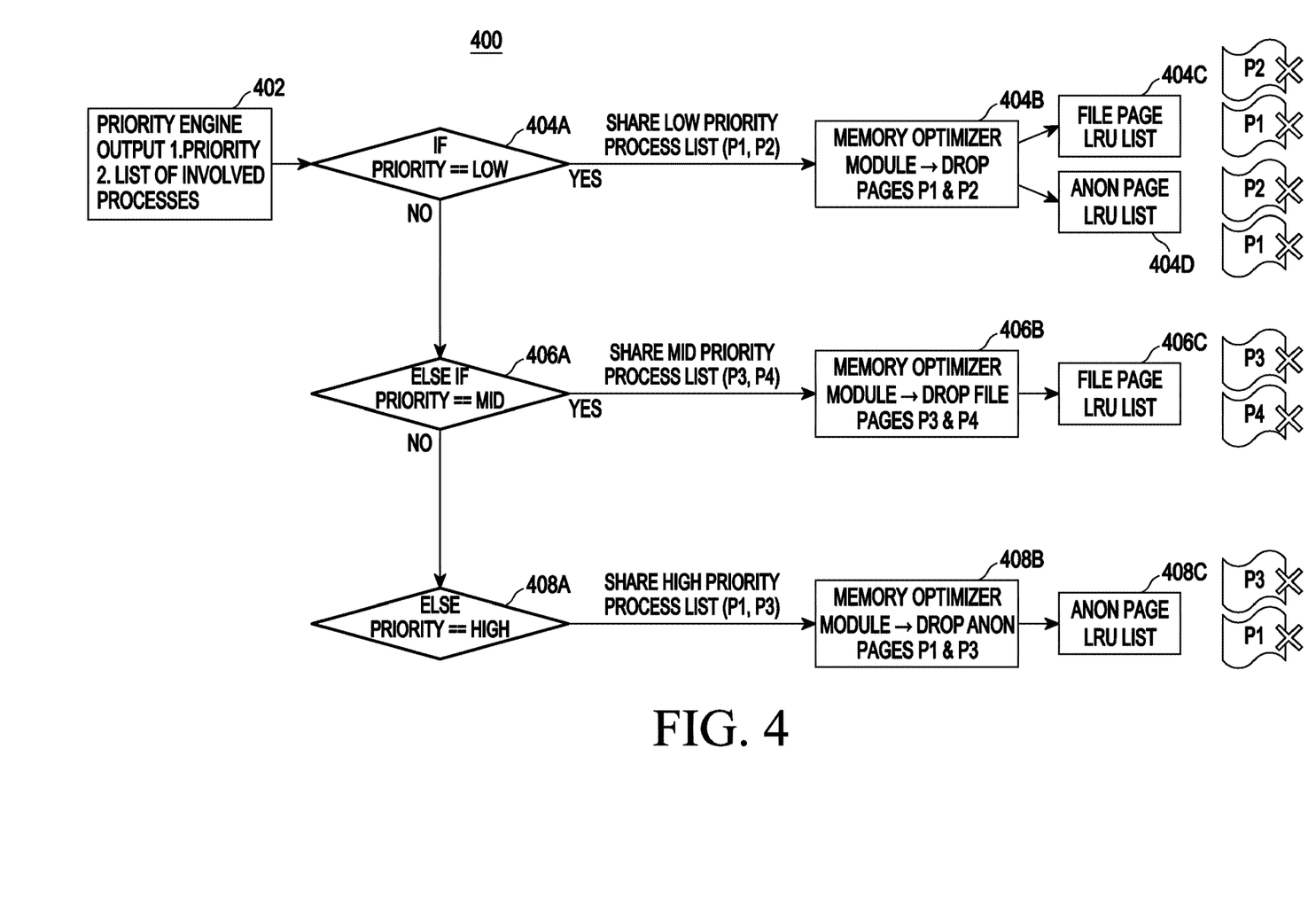
FIG. 4 is a flow diagram illustrating a method of dropping pages in the volatile memory, according to an embodiment of the disclosure.

FIG. 4 is a flow diagram 400 illustrating a method of dropping pages in the volatile memory 102, according to an embodiment of the disclosure.

Referring to FIG. 4, according to the priority determined for a selected process, anon and file pages are reclaimed to reduce process memory usage. Anon pages are pages not backed by a file on the non-volatile memory 108. File pages are backed by a file stored on the non-volatile memory 108. Based on whether the priority is low, mid-level or high, inactive anon or file pages are selected to be dropped by the volatile memory or reclaimed by the memory optimizer module 106. At operation 402, the priority engine 104 provides an indication of high priority, mid-priority or low priority. If the low priority is indicated as illustrated in operations 404A, 404B, 404C, and 404D, file pages and anon pages pertaining to the low priority application are reclaimed by the memory optimizer module 106 to reduce memory usage in the volatile memory 102. At operations 406A, 406B, and 406C, if the application is deemed mid-priority (as per Table 1), file pages are reclaimed by the memory optimizer 106. Subsequently, if the application is deemed high priority (as per Table 1) as illustrated in operations 408A, 408B, and 408C, anon pages are reclaimed. In this manner, memory usage in the volatile memory 102 is further reduced to make space for potential new application launches, for intensive applications such as multimedia applications, retaining a previous state of an application running in the background to provide continuation in processes or for enhancing multi-tasking.

Figure 5A:
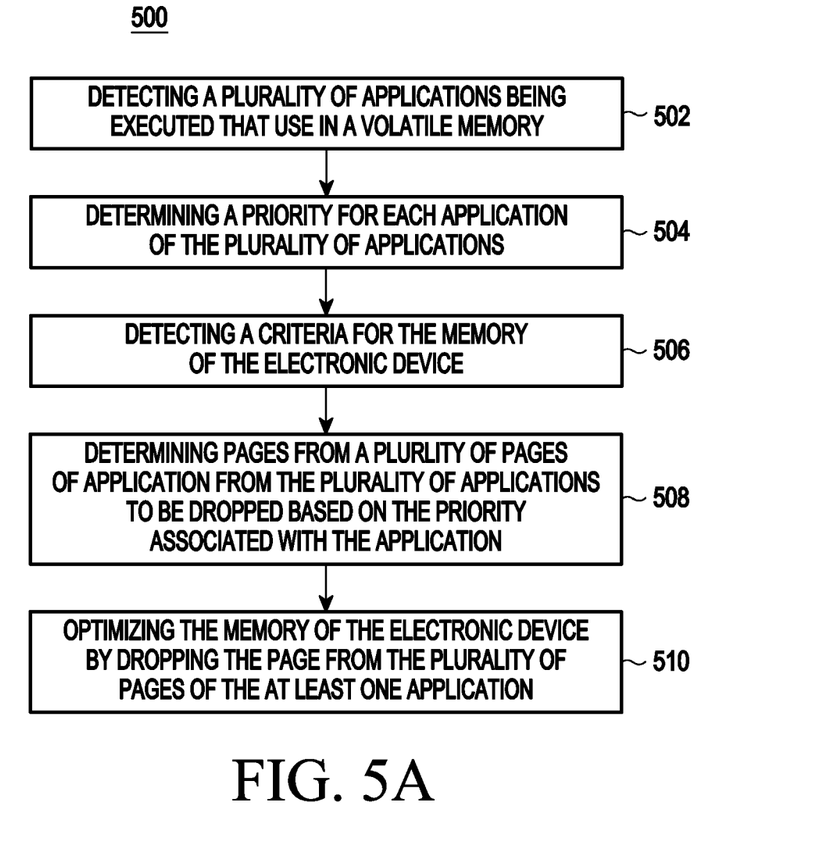
FIGS. 5A, 5B, and 5C are flow diagrams illustrating a sequence of operations for memory optimization with respect to the electronic device, according to various embodiments of the disclosure.
Figure 5B:
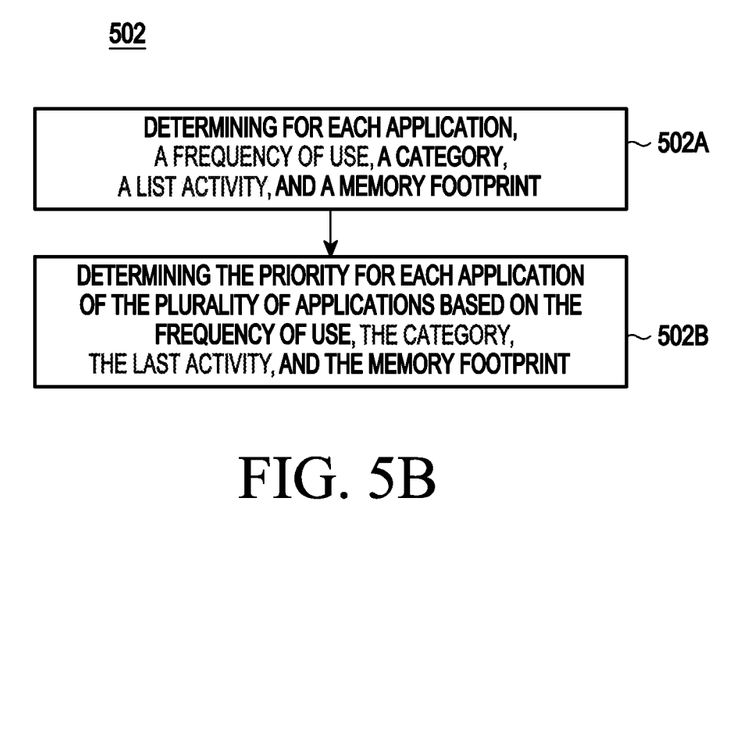
Figure 5C:
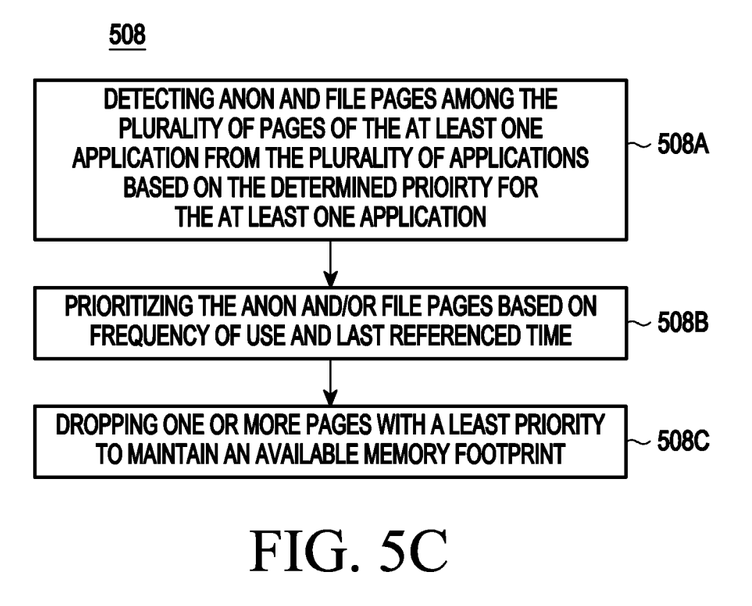

FIGS. 5A, 5B, and 5C are flow diagrams illustrating a sequence of operations 500 for memory optimization with respect to the electronic device 100, according to various embodiments of the disclosure.

Referring to FIGS. 5A, 5B, and 5C, the sequence of operations 500 includes detecting, by the electronic device 100, a plurality of applications being executed that use a volatile memory 102 of the electronic device 100 at operation 502; determining, by the electronic device 100, a priority for each application of the plurality of applications at operation 504; detecting, by the electronic device 100, a criteria for the memory 102 of the electronic device at operation 506; determining, by the electronic device 100, at least one page from a plurality of pages of at least one application from the plurality of applications to be dropped based on the priority associated with the at least one application at operation 508; and optimizing, by the electronic device 100, the memory of the electronic device by dropping the at least one page from the plurality of pages of the at least one application at operation 510.

In an embodiment, wherein the determining, by the electronic device 100, of the priority for each application of the plurality of applications comprises determining, for each application of the plurality of applications, a frequency of use, a category, a last activity at operation 502A, and a memory footprint; and determining the priority for each application of the plurality of applications based on the frequency of use, the category, the last activity, and the memory footprint at operation 502B.

In an embodiment, the category of the application is determined based on the process running state. For example, if the process is a system process that may be categorized as operating system application having a higher priority. In another example, if the user is interacting with the process running as a foreground process also have a high priority. If the process associated with a third party application, is currently not in use, the priority can be lower.

In an embodiment, wherein the determining, by the electronic device, of at least one page from the plurality of pages of the at least one application from the plurality of applications to be dropped based on the priority associated with the at least one application comprises detecting, by the memory optimizer 106, anon and file pages among the plurality of pages of the at least one application from the plurality of applications based on the determined priority for the at least one application at operation 508A; prioritizing at least one of the anon or file pages based on frequency of use and last referenced time at operation 508B and dropping, by the memory optimizer 106, the inactive pages based on the priority to maintain the available memory footprint at operation 508C.

Use case scenarios of the embodiments disclosed are provided in subsequent paragraphs.

A typical use case is in low memory electronic devices or computing devices where it is very difficult to keep processes in background. When any new application is launched, background processes is killed to provide memory for a newly launched application. So, it's very difficult to maintain multitasking. With the method illustrated in FIGS. 5A to 5C, a greater number of processes are held in background, thereby providing better multitasking. If the application is already in background and a user chooses to use it again launch time of the application is much lesser.

For example, at operation 502, the electronic device 100 detects a plurality of applications being executed that use the volatile memory 102. The priority engine 104 and the memory optimizer 106 determine a priority for each of the running application based on information stored in the application information database 112 using Equation 1. Applications pertaining to filling of a form and an incoming call may be executed at the same time. The user could attend to the incoming call and thereby the form filling application moves to the background. The user may want to pick up on the last running state of the form filling application. Thereby, a higher priority score is accorded to the form filling application. This could be in the range of greater than 4000 as per Table 1. To optimize memory footprint, the memory optimizer 106 determines priority scores for other background applications. As illustrated in FIG. 4, the file pages and anon pages are reclaimed by the memory optimizer module 106 based on the priority level. Accordingly, the last state of the form filling application is displayed to the user upon the completion of the received call.

In an embodiment, with respect to the above example, in a case in which the user does not revert back to the form filling application upon completion of the call, the priority score for the form filling application can be adjusted based on the period of time the user takes to re-launch the form filling application. Based on this criterion, in a case in which the user reverts back to the form filling application after a week or two, the last state of the form filling application may not be displayed as the priority score is adjusted and accordingly file pages or anon pages may have been reclaimed by the memory optimizer module 106. This may also be subject to user customization, where the user may customize the priority score accorded to the form filling application to be always high. In such a scenario, the high priority score of the form filling application is maintained.

While maintaining the high priority score, other background processes are trimmed in accordance with the corresponding priority score. For example, web browser processes may be killed or corresponding anon/file pages dropped to provide for a larger footprint for higher priority applications. A multimedia intensive application could automatically be accorded higher priority and a footprint may be appropriately adjusted so that there is enough memory footprint available for smooth running of the multimedia intensive applications such as games. In an embodiment, anon pages and file pages of background running applications such as web browsers, photo gallery applications and the like are dropped by the volatile memory 102 using the memory optimizer 106 to be reclaimed by the kernel management unit 114 based on the corresponding priority score determined by the priority engine 104 using Equation 1.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for managing a memory by an electronic device, the method comprising:
    detecting a plurality of applications being executed and using the memory of the electronic device;
    determining a priority for each of the plurality of applications;
    determining at least one page from a plurality of pages of at least one application from the plurality of applications to be dropped based on at least one priority associated with the at least one application; and
    dropping the at least one page from the plurality of pages of the at least one application,
    wherein determining the at least one page to be dropped comprises:
        detecting at least one anon page which is not backed by a file on the memory and at least one file page which is backed by a file on the memory, among the plurality of pages of the at least one application from the plurality of applications based on the at least one priority for the at least one application;
        determining the at least one anon page as the at least one page to be dropped in case that the at least one application has a first priority; and
        determining the at least one file page as the at least one page to be dropped in case that the at least one application has a second priority which is lower than the first priority.

2. The method of claim 1, wherein determining the priority for each of the plurality of applications comprises:
    determining, for each of the plurality of applications, a frequency of use, a category, a last activity, and a memory footprint; and
    determining the priority for each of the plurality of applications based on the frequency of use, the category, the last activity, and the memory footprint.

3. The method of claim 1, further comprising estimating an available memory footprint in the memory based on a memory footprint being collectively used by the plurality of applications being executed.

4. The method of claim 1, further comprising reclaiming a memory footprint in the memory used by the dropped at least one page from the plurality of pages.

5. The method of claim 1, wherein the memory is a volatile memory.

6. An electronic device comprising:
    memory storing instructions; and
    at least one processor coupled to the memory,
    wherein the instructions, when executed by the at least one processor, cause the electronic device to:
        detect a plurality of applications being executed and using the memory, and
        determine a priority for each of the plurality of applications,
        determine at least one page from a plurality of pages of at least one application from the plurality of applications to be dropped based on at least one priority associated with the at least one application, and
        drop the at least one page from the plurality of pages of the at least one application, and
    wherein for determining the at least one page to be dropped, the instructions, when executed by the at least one processor, cause the electronic device to:
        detect at least one anon page which is not backed by a file on the memory and at least one file page which is backed by a file on the memory, among the plurality of pages of the at least one application from the plurality of applications based on the at least one priority for the at least one application;
        determine the at least one anon page as the at least one page to be dropped in case that the at least one application has a first priority; and
        determine the at least one file page as the at least one page to be dropped in case that the at least one application has a second priority which is lower than the first priority.

7. The electronic device of claim 6, wherein, for determining the priority of each of the plurality of applications, the at least one processor is further configured to:
    determine, for each of the plurality of applications, a frequency of use, a category, a last activity, and a memory footprint; and
    determine the priority for each of the plurality of applications based on the frequency of use, the category, the last activity, and the memory footprint.

8. The electronic device of claim 6, wherein the at least one processor is further configured to estimate available memory footprint in the memory based on a memory footprint being collectively used by the plurality of applications being executed.

9. The electronic device of claim 6, wherein the at least one processor is further configured to reclaim a memory footprint in the memory used by the dropped at least one page from the plurality of pages.

10. The electronic device of claim 6, wherein the memory is a volatile memory.

11. A non-transitory computer readable medium storing instructions, wherein the instructions, when executed by at least one processor of an electronic device, cause the electronic device to perform operations, the operations comprising:
    detecting a plurality of applications being executed and using a memory of the electronic device;
    determining a priority for each of the plurality of applications;
    determining at least one page from a plurality of pages of at least one application from the plurality of applications to be dropped based on at least one priority associated with the at least one application; and
    dropping the at least one page from the plurality of pages of the at least one application,
    wherein determining the at least one page to be dropped comprises:
        detecting at least one anon page which is not backed by a file on the memory and at least one file page which is backed by a file on the memory, among the plurality of pages of the at least one application from the plurality of applications based on the at least one priority for the at least one application;

determining the at least one anon page as the at least one page to be dropped in case that the at least one application has a first priority; and determining the at least one file page as the at least one page to be dropped in case that the at least one application has a second priority which is lower than the first priority.

12. The non-transitory computer readable medium of claim 11, wherein determining of the priority for each of the plurality of applications comprises:

determining, for each of the plurality of applications, a frequency of use, a category, a last activity, and a memory footprint; and determining the priority for each of the plurality of applications based on the frequency of use, the category, the last activity, and the memory footprint.

13. The non-transitory computer readable medium of claim 11, wherein the operations further comprise estimating an available memory footprint in the memory based on a memory footprint being collectively used by the plurality of applications being executed.

14. The non-transitory computer readable medium of claim 11, wherein the operations further comprise reclaiming a memory footprint in the memory used by the dropped at least one page from the plurality of pages.

15. The non-transitory computer readable medium of claim 11, wherein the memory is a volatile memory.

\* \* \* \* \*